(12) United States Patent
Clarke (10) Patent No.: US 7,891,733 B1
(45) Date of Patent: Feb. 22, 2011

(54) ORIGINAL BACKSEAT PLAN HOLDER

(75) Inventor: Christopher Shay Clarke, 9434 Grasmeer Way, Elk Grove, CA (US) 95624

(73) Assignee: Christopher Shay Clarke, Elk Grove, CA (US)

( * ) Notice: Subject to any disclaimer, the term of this patent is extended or adjusted under 35 U.S.C. 154(b) by 0 days.

(21) Appl. No.: 12/383,276

(22) Filed: Mar. 23, 2009

(51) Int. Cl.
*A47C 7/62* (2006.01)
*B60R 7/00* (2006.01)
*A45F 4/00* (2006.01)
*A45C 15/00* (2006.01)
*A47F 7/00* (2006.01)
*B65D 33/14* (2006.01)

(52) U.S. Cl. ............. 297/188.06; 224/275; 224/584; 383/22; 211/85.3; 211/118

(58) Field of Classification Search ........... 297/188.06; 224/275, 584; 383/22; 211/113, 118, 85.2, 211/85.3
See application file for complete search history.

(56) References Cited

U.S. PATENT DOCUMENTS

| | | | | | |
|---|---|---|---|---|---|
| 746,013 | A | * | 12/1903 | Burton | 383/22 |
| 905,897 | A | * | 12/1908 | Manahan | 383/22 |
| 929,209 | A | * | 7/1909 | Grant | 383/22 X |
| 954,840 | A | * | 4/1910 | Weidemann | 383/4 X |
| 1,526,122 | A | * | 2/1925 | Dau | 383/39 X |
| 1,895,744 | A | * | 1/1933 | Arnold | 383/40 X |
| 2,507,842 | A | * | 5/1950 | Waddill | 224/560 |
| 2,577,713 | A | * | 12/1951 | Nogle | 211/104 X |
| D168,545 | S | * | 1/1953 | Huch | D6/315 |
| 2,645,547 | A | * | 7/1953 | Channer, Jr. | 312/245 |
| 2,767,895 | A | * | 10/1956 | Smith | 224/275 |
| D197,146 | S | * | 12/1963 | Fisher | D6/315 |
| 3,294,134 | A | * | 12/1966 | Matross et al. | 383/39 |
| 3,479,085 | A | * | 11/1969 | Weinstein | 297/188.06 X |
| 3,669,276 | A | * | 6/1972 | Woods | 211/34 |
| 3,746,179 | A | * | 7/1973 | Paumgardhen | 211/75 |
| 3,951,486 | A | * | 4/1976 | Tracy | 312/235.8 |
| D247,327 | S | * | 2/1978 | Tracy | D12/416 |
| 4,177,909 | A | * | 12/1979 | Haskell | 224/153 |
| 4,266,704 | A | * | 5/1981 | Swanson | 224/275 X |
| 4,327,836 | A | * | 5/1982 | Okuno | 211/113 X |
| 4,493,422 | A | * | 1/1985 | Kaegebein | 211/26 |
| 4,947,987 | A | * | 8/1990 | Keenan | 383/23 X |
| D312,349 | S | * | 11/1990 | Pogue | D12/416 |
| D312,727 | S | * | 12/1990 | Kunewalder | D12/416 |
| D324,953 | S | * | 3/1992 | Swanner | D12/416 |
| D344,180 | S | * | 2/1994 | Garcia | D12/416 |
| D351,730 | S | * | 10/1994 | Miller et al. | D3/299 |

(Continued)

*Primary Examiner*—Rodney B White (57) ABSTRACT

A backseat blueprint holder is disclosed. A hollow, rectangle-shaped body, from the front view, is oriented like a triangle, from the side view. To create each opening, the front and back panels are unattached along the sides with inserts attached, horizontally, to the front & back. The slots get gradually larger from top to bottom, allowing for different sizes to be held at one time. The outer surface of the rectangle-shaped body, front, has pockets and elastic loops to allow for more storage of items such as pens, small tools, and notebooks to business cards. A strap with a locking clasp or optional full cover head rest is provided to facilitate repositioning of the holder onto the vehicle headrest, allowing for it to be placed either on the back or the front of the seat during transportation, as needed; moreover being able to fit all types of the vehicle headrest.

19 Claims, 7 Drawing Sheets

U.S. PATENT DOCUMENTS

| | | | | |
|---|---|---|---|---|
| D366,356 S * | 1/1996 | Theis | | D3/11 |
| 5,490,623 A * | 2/1996 | McConnell | | 224/275 |
| D369,025 S * | 4/1996 | Miller et al. | | D3/299 |
| D379,452 S * | 5/1997 | Russell et al. | | D12/416 |
| 5,803,325 A * | 9/1998 | Wang | | 224/275 |
| 5,878,672 A * | 3/1999 | Ostermann et al. | | 297/188.06 X |
| D411,354 S * | 6/1999 | Wilson | | D3/328 |
| 5,984,347 A * | 11/1999 | Blanc-Rosset | | 297/188.06 X |
| 6,006,462 A * | 12/1999 | Lackomar | | 297/188.06 X |
| 6,006,963 A * | 12/1999 | Paine | | 223/85 |
| D419,520 S * | 1/2000 | Bergh | | D12/416 |
| 6,030,034 A * | 2/2000 | Plohetski | | 297/188.06 |
| D430,534 S * | 9/2000 | Golenz | | D12/416 |
| D432,075 S * | 10/2000 | Hassett et al. | | D12/416 |
| D441,341 S * | 5/2001 | Hassett et al. | | D12/416 |
| 6,237,267 B1 * | 5/2001 | Lackomar | | 297/188.06 X |
| D447,999 S * | 9/2001 | Thomson | | D12/416 |
| 6,405,909 B1 * | 6/2002 | Burnett et al. | | 224/275 |
| 6,637,609 B2 * | 10/2003 | Stevens | | 211/118 |
| 6,763,986 B2 * | 7/2004 | Santos et al. | | 224/585 |
| D497,874 S * | 11/2004 | Fialla-Dori | | D12/416 |
| 6,896,164 B2 * | 5/2005 | Fialla-Dori | | 224/275 |
| D519,915 S * | 5/2006 | Eskandry | | D12/417 |
| D536,564 S * | 2/2007 | McGrath | | D6/570 |
| 7,207,626 B2 * | 4/2007 | Hassett | | 297/188.06 |
| D546,559 S * | 7/2007 | Boyette | | D3/266 |
| D560,912 S * | 2/2008 | Williams et al. | | D3/315 |
| D566,964 S * | 4/2008 | Greiner | | D3/293 |
| 7,357,270 B2 * | 4/2008 | Mayrose | | 220/23.86 |
| 7,464,988 B2 * | 12/2008 | Hassett et al. | | 297/188.06 |
| 7,631,770 B2 * | 12/2009 | Martin | | 211/113 X |
| 2004/0026966 A1 * | 2/2004 | Albersen | | 297/188.06 |
| 2005/0231009 A1 * | 10/2005 | Hassett | | 297/188.06 |
| 2007/0158377 A1 * | 7/2007 | Hassett et al. | | 224/275 |
| 2007/0228782 A1 * | 10/2007 | Hassett et al. | | 297/188.06 |
| 2008/0073948 A1 * | 3/2008 | Livingston et al. | | 297/188.06 X |

\* cited by examiner

ORIGINAL BACKSEAT PLAN HOLDER

FIELD OF THE INVENTION

The present invention relates to blueprint holders and, more particularly, to a blueprint holder that is made and designed for holding rolled sets of plans in a vehicle for safe transport and storage within a vehicle.

BACKGROUND OF THE INVENTION

The problem is the that there is nothing like this in existence.

There are no other solutions in existence that holds blueprints inside vehicles in this manner.

The short comings are that there are no other solution.

It would be advantageous to provide a holder for blueprints in a vehicle.

It would also be advantageous to provide a blueprint holder that is resistant to tipping over in the vehicle.

It would also be advantageous to provide a blueprint holder that holds a number of sizes of rolled plans.

It would also be advantageous to provide a blueprint holder that will allow one to store plans along with passengers.

It would also be advantageous to provide a blueprint holder that will keep them in viewable condition through out the building process and out of the tool box, to prevent damage.

It would further be advantageous to provide a blueprint holder that will hold a number of plans as well as the small office supplies, notebooks, and small tools alike.

It would also be advantageous to provide a blueprint holder to the industry because there are none exists today and demand is warrants it

SUMMARY OF THE INVENTION

In accordance with the present invention, there is provided a blueprint holder that is both functional and decorative.

A hollow, rectangle-shaped body, from the front view, is oriented like a triangle, from the side view, with its openings at its outermost sides. Attached, inside, to the front and back are inserts of the same material that makes up the slots which hold or cradles each set of rolled up blueprints. Attached to the front are pockets of various sizes and can be as many as desired, and elastic loops for holding small items, such as small tools to pencils and business cards to note books; moreover, for the nature of the pockets. The size of the openings can be greater from the upper opening to the lower openings, which allows the ability to hold different sizes of diameter of rolled sets of blueprints, which is illustrated in the drawings vs. showing all of the openings of the same size. Having the different sizes allows the holder to maintain the blueprints—of different size diameters—in the slots from falling out while the vehicle is moving. The versatility of the original backseat plan holder is benefit of being able to hang from the front or the back of a vehicle seat headrest, by either a strap with a clasp lock or full headrest cover made of the same material, that is either is attached to the top hexagon shape area, of the original backseat plan holder.

BRIEF DESCRIPTION OF THE DRAWINGS

A complete understanding of the present invention may be obtained by reference to the accompanying drawings, when considered in conjunction with the subsequent, detailed description, in which:

FIG. 1 is a front perspective view of a backseat plan holder in accordance with the invention, the broken line outside the plan holder representing the seat & environment and forming no part of the claimed design; however the smaller dotted lines represent stitching. the interior dividers, though shown ridged, are not. they are made of the same type of fabric and actually will drape to cradle the blueprints. the large pocket, square shape, at the bottom can vary in size as well as the small pocket to the top right, just above it. the utility loops are to the left of the small pocket and is shown with an image of a large marker inside one of the loops in broken lines; therefore, noting that it, the marker, has no relevance to the invention. at the top is the headrest clasp that is shown unlocked. it is also illustrated how it can be attached to the top of the plan holder by dotted lines showing the stitching across the top and again just below that line; moreover you can see how the front panel tapers from the connection of the middle and back panel up to the headrest strap;

For purposes of clarity and brevity, like elements and components will bear the same designations and numbering throughout the Figures.

DESCRIPTION OF THE PREFERRED EMBODIMENT

Figure 1:
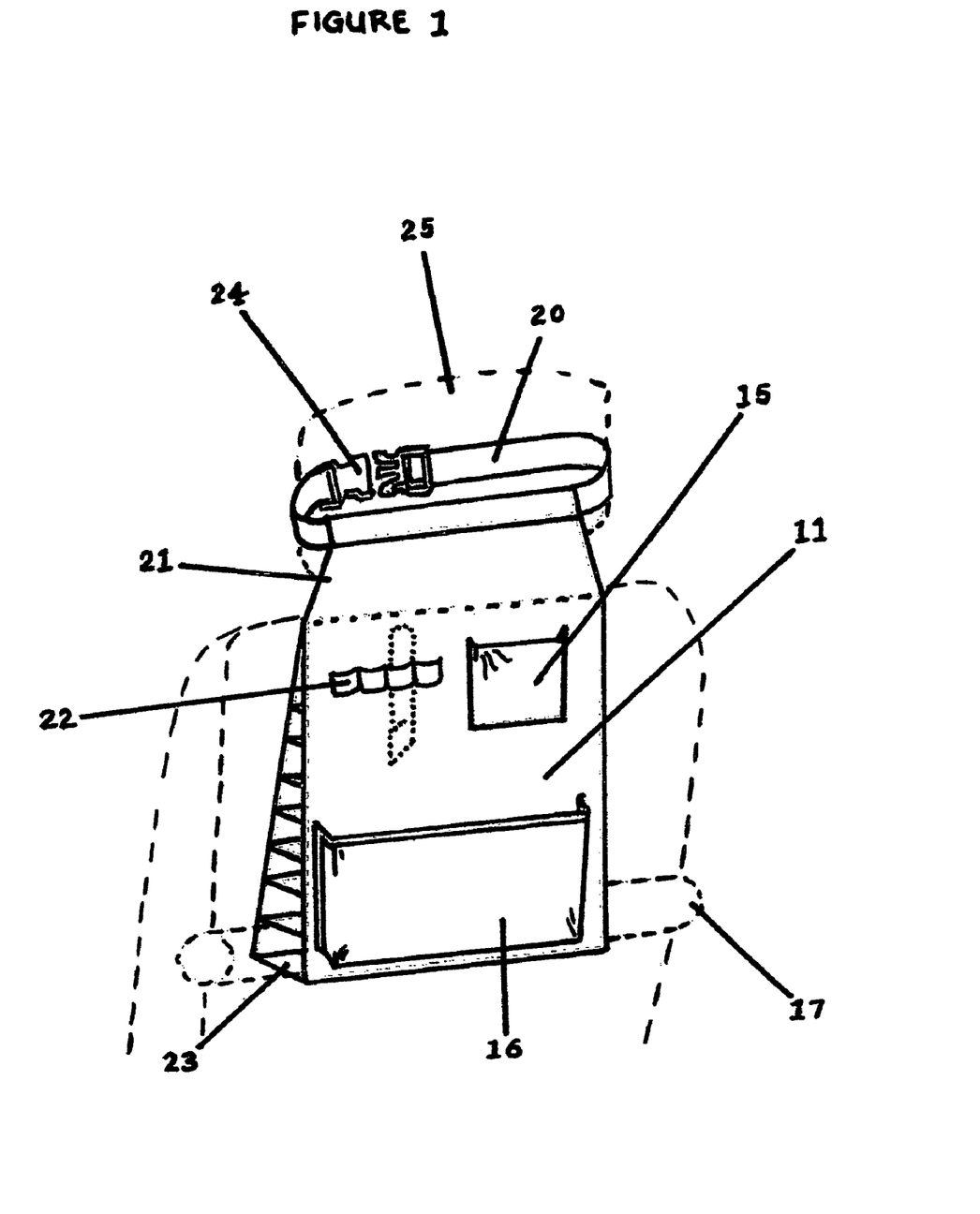
Figure 2:
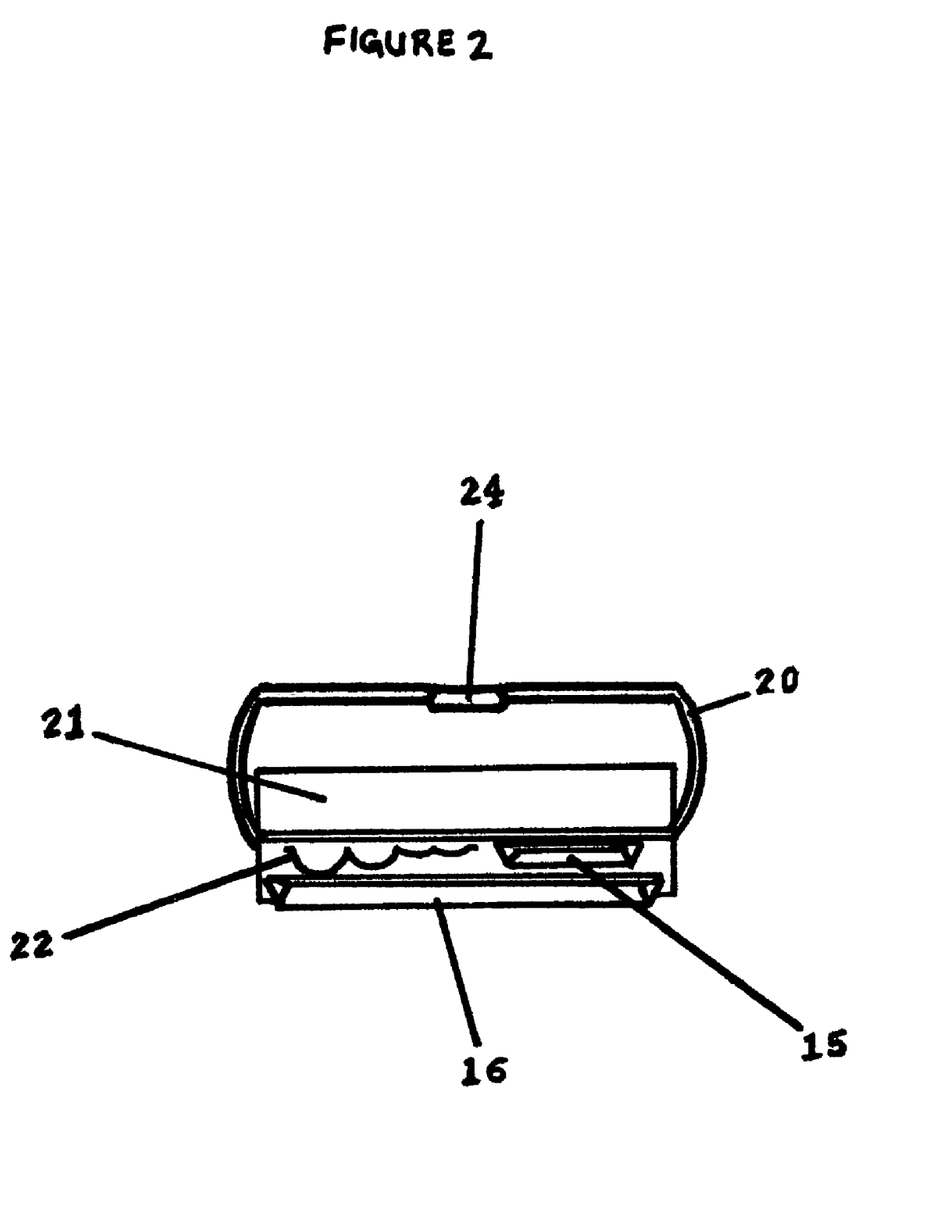
FIG. 2 is a top elevation view of a backseat plan holder with the headrest strap in the locked position of the clasp located toward the top of the drawing. the rectangle shape represents a top view of the very bottom of the plan holder, with the dissecting horizontal line being the top of the plan holder where the panels come together to create an image of a triangle from the side view. the utility loops are represented as images the are similar to waves located near the middle and slightly to the left off the center of the picture, with the small pocket to the right of them and the large pocket is below them as in FIG. 1.
Figure 3:
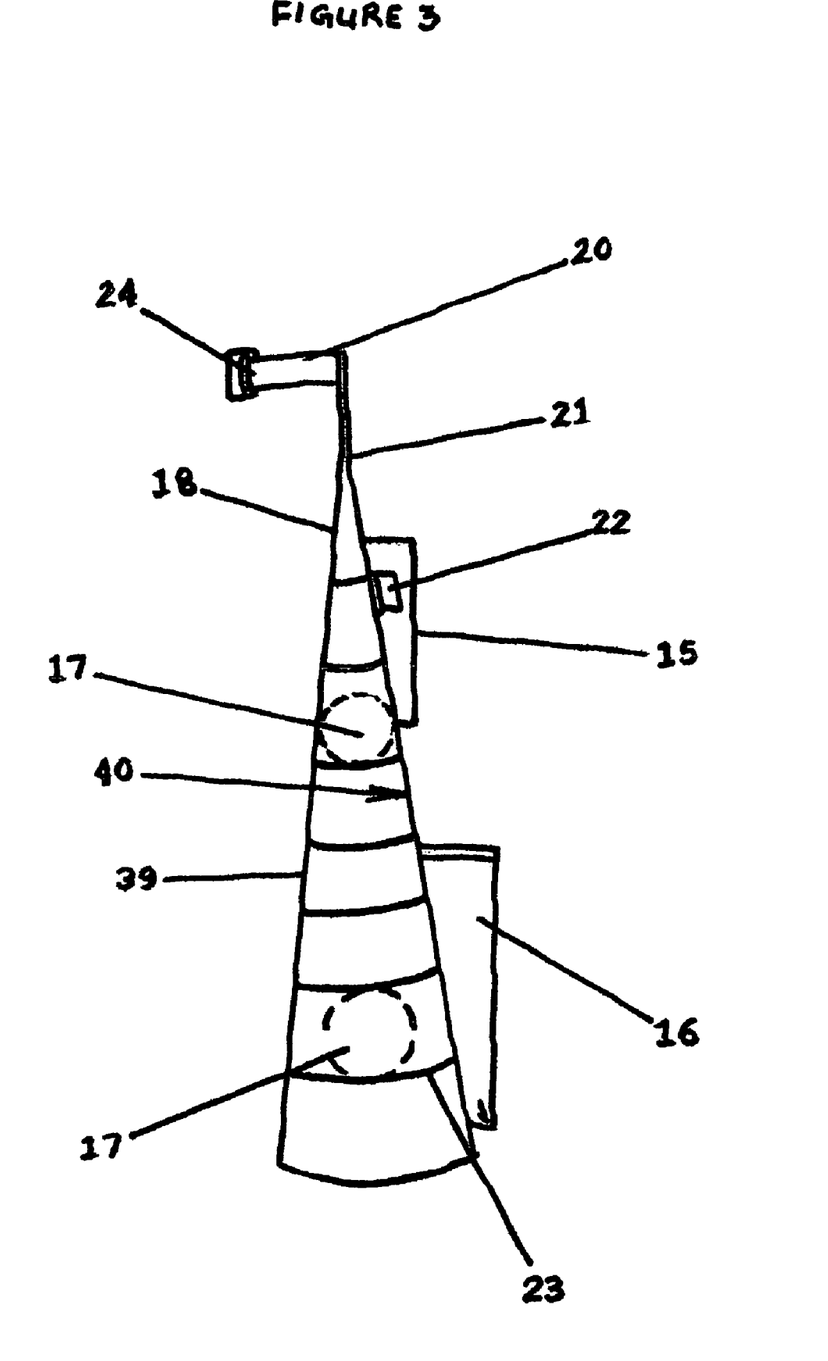
FIG. 3 is a left detail view of a backseat plan holder with a headrest strap shown off the top left, where the panels come together at the top. to the right side you have the larger pocket on the bottom and the smaller on the top just behind the utility loops. the dotted round lines represent blueprints and no part of the invention. the middle panel and the front panel, which the pockets are attached to, are stitched together and are represented as one line along the right side of the triangle. the horizontal lines represent the interior dividers that hold each set of rolled blueprints in place and act as structural support also for the front and back panels as in FIG. 1.
Figure 4:
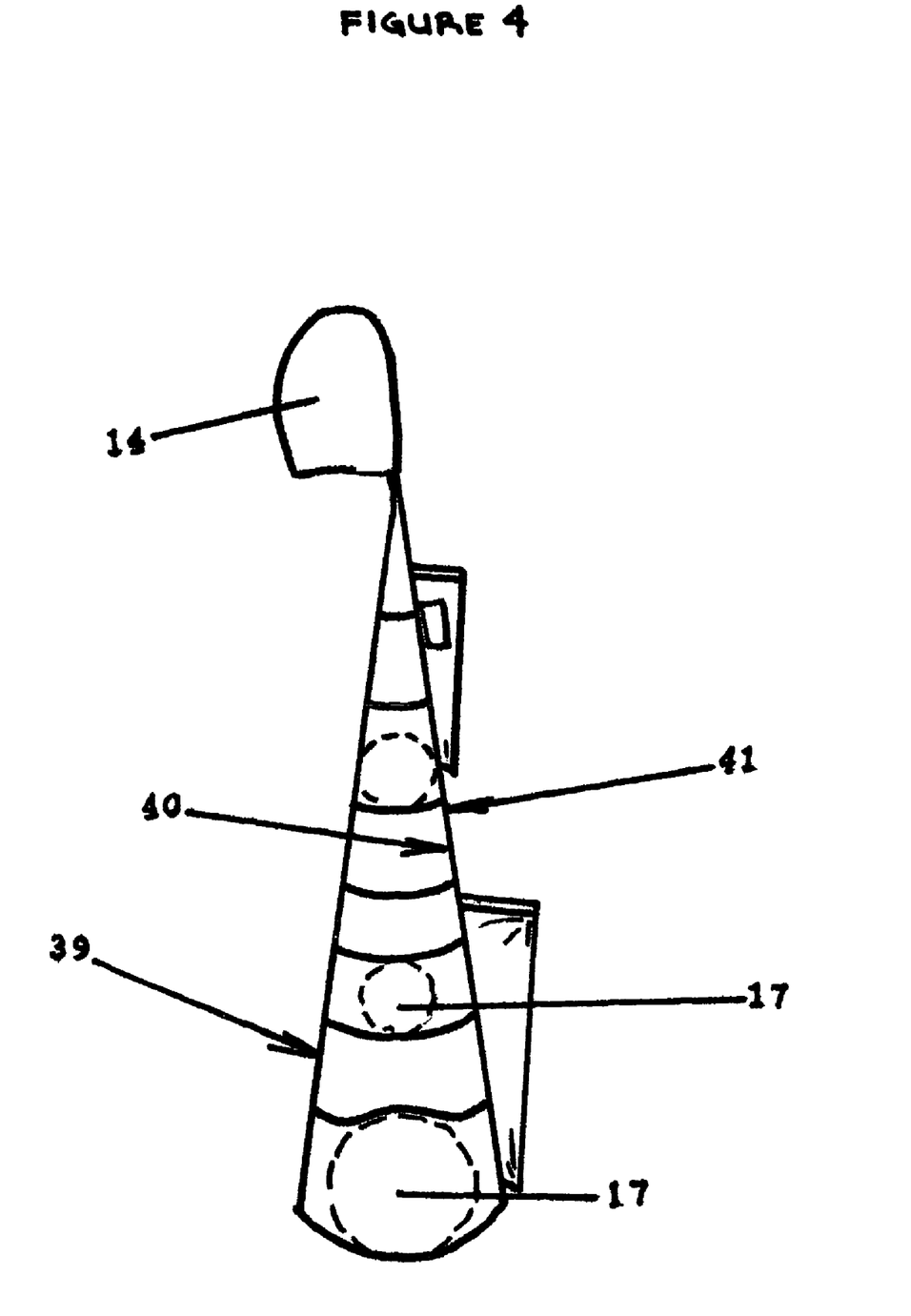
FIG. 4 is an alternate right elevation view of an alternate embodiment of the inventive backseat plan holder with the full cover headrest attachment, located at the top exactly where the headrest strap is attached and the entire body is constructed the same as described in FIG. 3.
Figure 5:
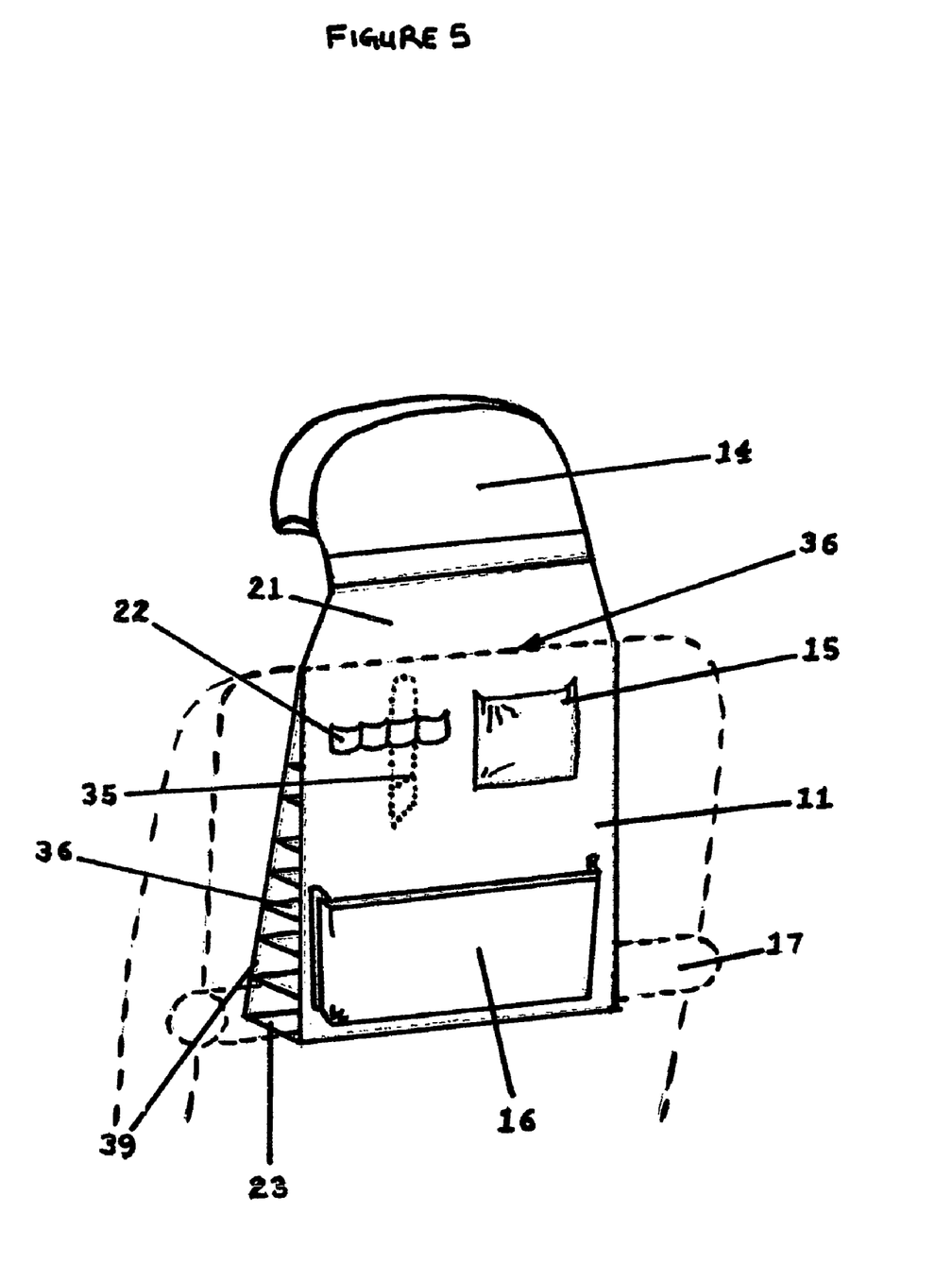
FIG. 5 is a perspective view of an another alternate embodiment of the invention with a full cover headrest attachment to allow another option to hang the plan holder from the front or back of the seat vs. the headrest strap, with the entire body constructed as described in FIG. 1.
Figure 6:
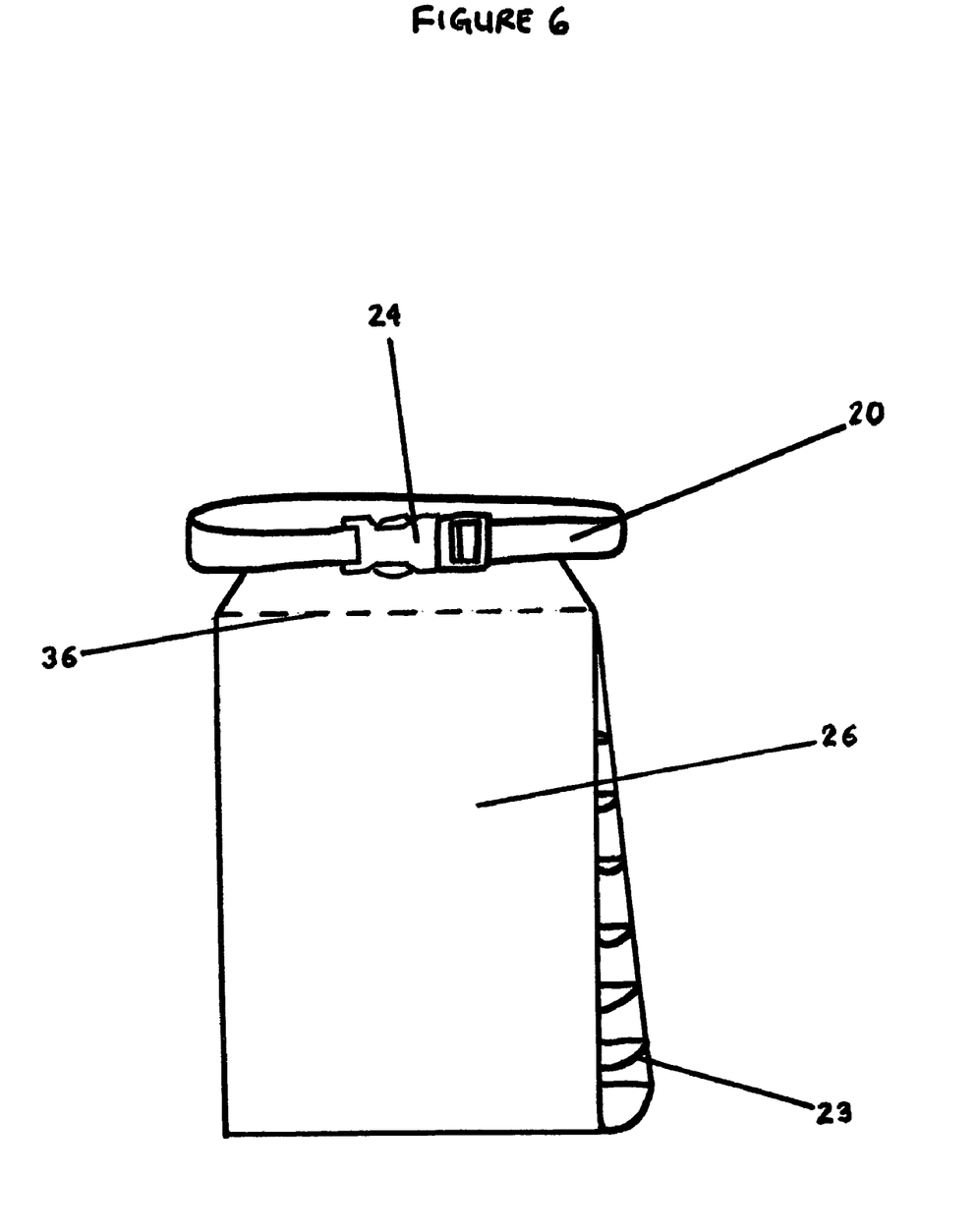
FIG. 6 is a rear elevation view of a backseat plan holder with the headrest strap in the locked position.
Figure 7:
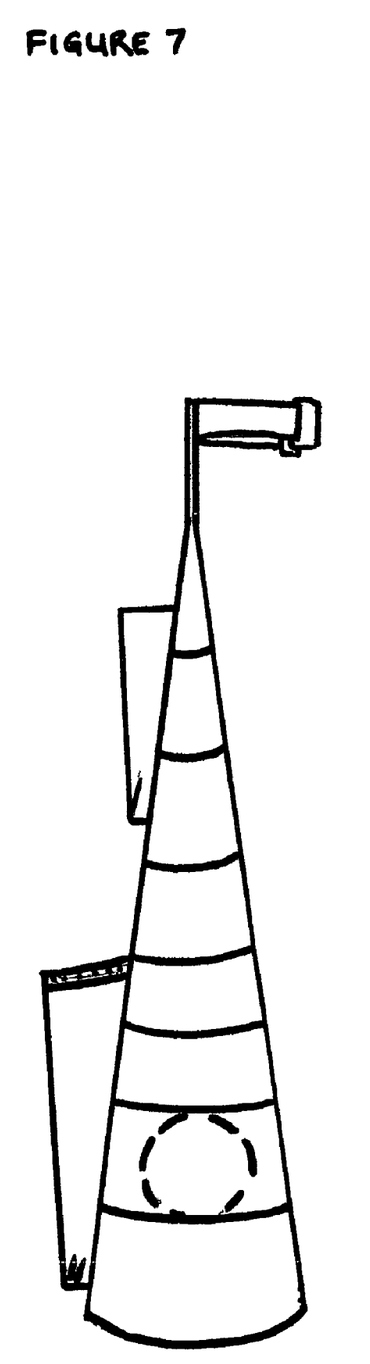
FIG. 7 is a right elevation view of a backseat plan holder with the strap as describe in FIG. 3, with the exception that the utility loops are on the back side of the small pocket and cannot be seen from this elevation.

FIG. 1 is a perspective view of the original backseat plan holder 11, in accordance with the invention. A number of blueprints 17 along with a number of different size diameter rolled sets can be held at one time by the original backseat plan holder 11. The holder may also accommodate a notebook size binder in one pocket 15 and large tape measurer and small note pad in another pocket 16. Next to the small pocket 15 there is a place 22 for writing implements or small tools 35. To hold this all in place is either a headrest strap 20 with a locking clasp 24 or an alternate seat holder that includes a hood 14, made of the same material as the original backseat plan holder 11, that covers the entire head rest. The body is made up of three rectangle panels, with the front panel 41 inches longer and slightly tapered at the top corners to form a tapered portion 21, but still flat across the top as seen in FIG. 1. This allows the rear or back side 26 of the holder to lie flat along the seat. The entire unit is made of the same fabric, which can be made of any durable duct cloth to any type of nylon. The top of the front panel 41 is about the width of a vehicle head rest. Inches from the top, the panels then taper down and out to meet the same width as the other two panels, as well as the length as seen in FIG. 6. This top portion of the front panel 41 closely but not exactly resembles half of a hexagon as seen in FIG. 1. Along the back of the top edge of the front panel 41 is where a high strength strap with a clasp lock 24, as seen in FIG. 6, or a full hood 14 to cover the entire head rest is sewn on it as seen in FIG. 5. The front panel 41 is sewn on separately to allow the elastic writing implement holder, the pocket 15, and the notebook pocket 16 to be sewn on without interfering with the inserts 23 as seen in FIG. 3. In FIG. 1 you can see how the pocket 15 is placed near the upper right hand corner of the front panel 41, at its widest point equal to the other panels, and sewn along its sides and bottom to the front panel 41. The elastic writing implement holder is sewn near the left hand corner and centered to the height of pocket 15 as seen in FIG. 5. The writing implement holder is made of an elastic strap that can be laid out horizontally and sewn vertically every so often, as seen in FIG. 2, to make up as many loops and sizes as needed, to fit your writing implements or small tools 35. The notebook pocket 16 is placed and centered along the bottom of the front panel 41 and sewn along the bottom and the sides of the notebook pocket 16 to the front panel 41 as seen in FIG. 5. With that set aside, move to the back and center panels. These two are of the same size, shaped like a rectangle. These two are brought together by inserts 23 of the same material that act like separate shelves, making up the slots that will cradle each set of blueprints 17 as seen in FIG. 4, and then completed by stitching 36 both panels together across the top to create triangle image from the right and left side views. On the middle panel 40 inserts of the same material, all cut the same width of the panel but slightly different depths, using stitching 36 horizontally along one of their longest edges as seen if FIG. 5 placed every so many graduated inches down the middle panel 40 to the bottom. The same method of stitching, with the free side of each of the inserts, is to be sewn on the back panel 39. This time, you must start to sew from the largest insert on the bottom. This allows room for stitching each with ease of access to each. When you get to the top, stitching across will bring it closed and from the right side view or left side view it will look like a long thin triangle with dissecting horizontal lines. This will create open slots from top to bottom that get gradually larger in a descending order as seen in FIG. 7. After you completed sewing the ends closed, the rectangle section of the front panel 41 can be lined up against the middle panel 40 and stitched all the way around the rectangle as seen in FIG. 5. This will create stitching lines across the bottom of the hexagon shape as shown in FIG. 6, which will be just above the pocket 15 on the upper right corner of the front panel 41.

FIG. 2 is an enlarged, top view of original backseat plan holder 11 of FIG. 1. Attached to the top of original backseat plan holder 11 is a resilient, deformable strap with a commonly known clasp to hold it around the head rest. The strap is a fabric of durable grade, in the preferred embodiment of nylon but not limited to it, so that the particulate material of the strap can provide a secure and safe function to original backseat plan holder 11. The utility loops 22 create extra storage using minimal surface space on original backseat plan holder 11.

FIG. 3 is the left detail view of original backseat plan holder 11 with the headrest strap 20 and triangle-shaped profile of the original backseat plan holder 11 shown in FIG. 1. Note how each of the slots are open at both ends allowing for various size of blueprints 17 to be stored at the same time.

FIG. 4 is a left view detail with an alternate hooded seat holder of the inventive original backseat plan holder 11. Note that alternate headrest 25 attachment, although generally in the shape of a head rest (FIG. 5), may have a slight rectangular shape. Beneficially, with the inserts being of the same material through out, it allows the top and bottom slots to conform to the shape of large plans (FIG. 4)

FIG. 5 is a perspective view with the alternate hooded seat holder of the invention. Specifically, it allows for an option to hold original backseat plan holder 11 on to a seat.

FIG. 6 is a rear elevation view of original backseat plan holder 11 as seen in FIG. 1.

FIG. 7 is a right elevation view of original backseat plan holder 11 as seen in FIG. 1.

Thus, in summary, it can be seen that what is provided in this invention is original backseat plan holder 11 that is both functional and decorative. A hollow, rectangle-shaped body panels is oriented, like a triangle from the side view, with its largest opening at its lowermost point. Attached to its front panel 41 is an oversized notebook pocket 16 small tool pocket 15 and elastic loops for writing implements. The circumference of the upper openings are smaller than the circumference of the lower openings of the horizontal slots. The entire construction of original backseat plan holder 11 is made of a strong design and fabric in order to provide a secure and resilient blueprint holder that can be placed in any truck or vehicle full of blueprints 17 and with stand the daily duties of a contractor.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. An original backrest plan holder for holding blueprints, writing implements, tools, and notebooks in a vehicle in an organized and safe manner comprising:

A storage compartment for holding a plurality of and multiple sizes of blueprints;

the storage compartment including three substantially rectangular panels having a top end, left and right sides, and a bottom end; the three rectangular panels including a back panel, a middle panel, and a front panel, the back and middle panels having the same width and length, the front panel having the same width as the back panel and the middle panel and a length longer than the back panel and the middle panel; the longer length of the front panel forming a tapered portion at a top end of the front panel;

a plurality of horizontally oriented, vertically displaced inserts having the same width as the back, middle, and front panels, the inserts extending between and connecting the back panel and the middle panel, the inserts attached to the back and middle panels along lengthwise free edges of the inserts; the back panel and the middle panel connected to one another at top ends thereof; the back panel, inserts, and middle panel forming a interior space of the storage compartment with a triangular-shaped cross-section that is adapted to lie flat against a backrest of a vehicle seat; each insert decreasing in depth toward a top end of the storage compartment complementary to the triangular-shaped cross-section of the storage compartment, wherein the inserts form vertically arranged shelves or slots accessible from right and left sides of the backseat plan holder, the vertically arranged shelves or slots adapted to hold blueprints of various sizes;

the front panel is attached to outer edges of the middle panel at the bottom end and the left and right sides of the middle panel;

the front panel further including a first small pocket on an outer surface for storing measuring implements, small tools, and note pads; a second larger pocket on the outer surface dimensioned and adapted to store papers, notebooks, and/or binders;

the front panel further including a plurality of elastic loops on the outer surface for holding writing implements and other tools; and an attachment means attached to the tapered portion of the front panel, the attachment means adapted to releasably attach the backseat plan holder to the headrest or backrest of a vehicle seat.

2. The backseat plan holder of claim 1, wherein the attachment means is a strap connected to the tapered portion of the front panel, the strap having a first end and a second end, the strap having a fastener that includes male and female portions attached to the first and second ends of the strap, respectively, for fastening the first and second ends of the strap together to releasably attach the backseat plan holder to the headrest or a backrest of a vehicle seat.

3. The backseat plan holder of claim 2, wherein the strap is sewn to the tapered portion of the front panel.

4. The backseat plan holder of claim 2, wherein the strap is made of a resilient, deformable material.

5. The backseat plan holder of claim 4, wherein the resilient, deformable material is nylon.

6. The backseat plan holder of claim 1, wherein the attachment means is a hood connected to the tapered portion of the front panel, the hood adapted to slip over the headrest or upper end of a backrest of a vehicle seat to releasably attach the backseat plan holder to the headrest or a backrest of a vehicle seat.

7. The backseat plan holder of claim 6, wherein the hood is sewn to the tapered portion of the front panel.

8. The backseat plan holder of claim 1, wherein the plurality of elastic loops are horizontally oriented on the front panel.

9. The backseat plan holder of claim 1, wherein the plurality of elastic loops is made from one piece of a material looped and stitched at intervals to the front panel to form the plurality of elastic loops.

10. The backseat plan holder of claim 9, wherein the material forming the elastic loops is nylon.

11. The backseat plan holder of claim 1, wherein the back, middle, and front panels are made of the same material.

12. The backseat plan holder of claim 11, wherein the material used to make the back, middle, and front panels is selected from the group of cloth, fabric, or nylon.

13. The backseat plan holder of claim 11, wherein the inserts are made of the same materials as the back, middle, and front panels.

14. The backseat plan holder of claim 13, wherein the material used to make the inserts is selected from the group of cloth, fabric, or nylon.

15. The backseat plan holder of claim 11, wherein the hood is made from the same material as the back, middle, and front panels.

16. The backseat plan holder of claim 15, wherein the material used to make the hood is selected from the group of cloth, fabric, or nylon.

17. The backseat plan holder of claim 1, wherein the inserts are connected to the back and middle panels by stitching.

18. The backseat plan holder of claim 1, wherein the top end of the back panel is connected to the top end of the middle panel by stitching.

19. The backseat plan holder of claim 1, wherein the front panel is attached to the bottom end and the left and right sides of the middle panel by stitching.

* * * * *